United States Patent
Kousai

(10) Patent No.: US 8,112,112 B2
(45) Date of Patent: Feb. 7, 2012

(54) RADIO APPARATUS AND RADIO RECEIVING METHOD

(75) Inventor: Shouhei Kousai, Pasadena, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 672 days.

(21) Appl. No.: 12/241,681

(22) Filed: Sep. 30, 2008

(65) Prior Publication Data

US 2009/0088201 A1 Apr. 2, 2009

(30) Foreign Application Priority Data

Oct. 1, 2007 (JP) ................. 2007-258008

(51) Int. Cl.
*H04B 1/38* (2006.01)
*H04M 1/00* (2006.01)

(52) U.S. Cl. ............ 455/552.1; 455/553.1; 455/73; 375/320; 375/322

(58) Field of Classification Search .......... 455/552.1, 455/553.1, 73; 375/320, 322
See application file for complete search history.

(56) References Cited

U.S. PATENT DOCUMENTS

| | | | | |
|---|---|---|---|---|
| 5,757,858 A | * | 5/1998 | Black et al. | 375/295 |
| 5,812,607 A | * | 9/1998 | Hutchinson et al. | 375/322 |
| 7,383,024 B2 | | 6/2008 | Mueller et al. | |
| 2003/0071684 A1 | | 4/2003 | Noori | |
| 2003/0102960 A1 | * | 6/2003 | Beigel et al. | 340/10.1 |
| 2005/0084238 A1 | * | 4/2005 | Kashino et al. | 386/69 |
| 2005/0094745 A1 | * | 5/2005 | Miyanaga et al. | 375/320 |
| 2005/0135508 A1 | * | 6/2005 | Kim et al. | 375/326 |
| 2007/0099669 A1 | * | 5/2007 | Sadri et al. | 455/562.1 |
| 2008/0143453 A1 | * | 6/2008 | Ichiyama et al. | 331/167 |
| 2009/0088201 A1 | * | 4/2009 | Kousai | 455/552.1 |

FOREIGN PATENT DOCUMENTS

| | | |
|---|---|---|
| JP | 2000-13274 | 1/2000 |
| JP | 2003-133981 | 5/2003 |
| JP | 2007-505591 | 3/2007 |
| WO | WO 2004/114683 A2 | 12/2004 |

* cited by examiner

*Primary Examiner* — Jinsong Hu
*Assistant Examiner* — Qun Shen
(74) *Attorney, Agent, or Firm* — Oblon, Spivak, McClelland, Maier & Neustadt, L.L.P.

(57) ABSTRACT

A radio apparatus includes a receiver which receives a wirelessly transmitted signal as a reception signal, a transmitter which is provided in the vicinity of the receiver and generates a transmission signal having a frequency different from that of the reception signal, and a reception signal extracting unit which extracts a reception signal from an input signal containing the reception signal and the transmission signal, at a timing of a zero crossing of the transmission signal in the input signal, by using phase information including the phase of the transmission signal from the transmitter.

17 Claims, 6 Drawing Sheets

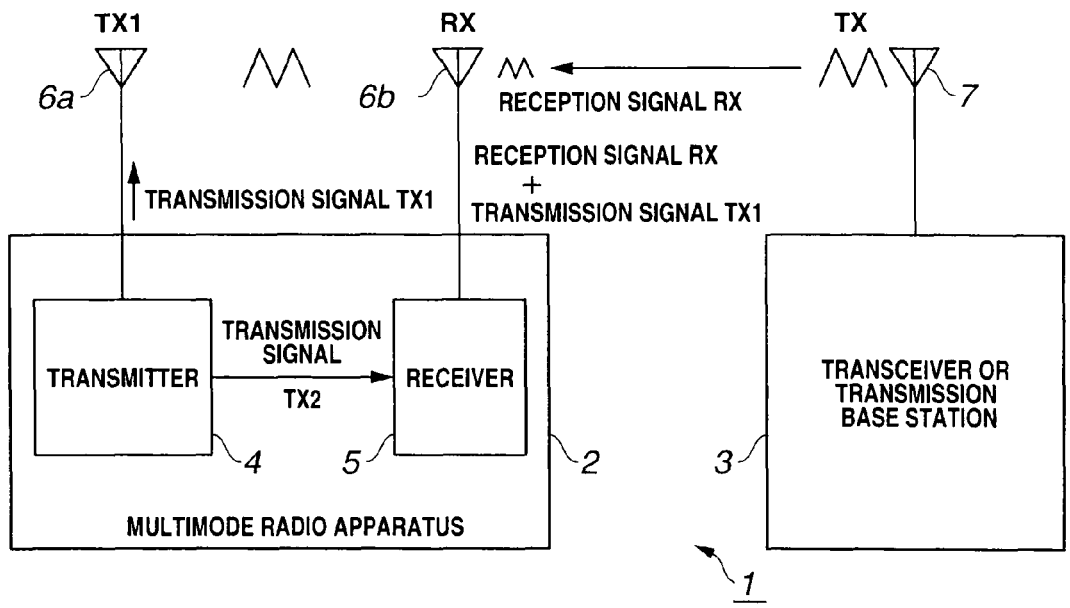
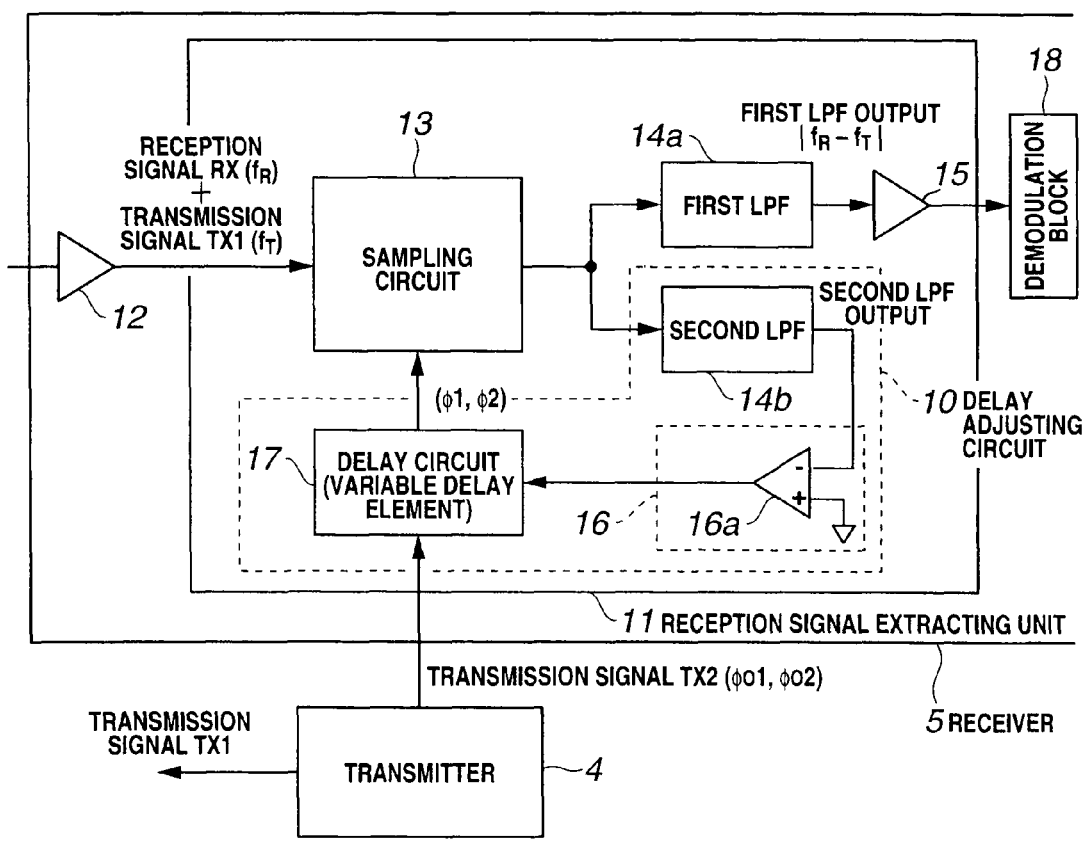

TRANSMISSION SIGNAL TX1 ($f_T$)

RECEPTION SIGNAL RX ($f_R$)

$\phi 1$ $\phi 2$

SECOND LPF OUTPUT

FIRST LPF OUTPUT

TRANSMISSION
SIGNAL TX1 ($f_T$)

RECEPTION
SIGNAL RX ($f_R$)

$\phi 1$ $\phi 2$

SECOND LPF OUTPUT

FIRST LPF OUTPUT

INPUT AMPLITUDE OF RECEPTION SIGNAL
(INPUT AMPLITUDE OF TRANSMISSION SIGNAL TX1 = 1 V)

RADIO APPARATUS AND RADIO RECEIVING METHOD

CROSS-REFERENCE TO RELATED APPLICATION

This application is based upon and claims the benefit of priority from the prior Japanese Patent Application 2007-258008 filed on Oct. 1, 2007; the entire contents of which are incorporated herein by this reference.

BACKGROUND OF THE INVENTION

1. Field of the Invention

The present invention relates to a radio apparatus and radio receiving method capable of performing radio transmission and reception at the same time.

2. Description of the Related Art

Multimode radio apparatuses have been made available in recent years that are radios or radio devices that can be used in multiple modes such as multiple frequency bands.

For example, Japanese Patent Application Laid-Open Publication No. 2000-13274 discloses a multimode radio apparatus including CDMA (Code Division Multiplex Access) and PDC (Personal Digital Cellular System) transmission units. The technique in Japanese Patent Application Laid-Open Publication No. 2000-13274 can reduce the number of components in transmission units by sharing circuits between the wideband CDMA and PDC transmission units.

Japanese Patent Application Laid-Open Publication No. 2003-133981 discloses a reception unit of a multimode radio apparatus that receives wideband and narrowband signals. The technique in Japanese Patent Application Laid-Open Publication No. 2003-133981 can reduce the size of the apparatus by sharing circuits of the reception unit between the two modes.

When transmission and reception of signals are performed based on more than one standard in an apparatus, that is, transmission is performed based on one standard and reception is performed based on another standard, a signal transmitted by the apparatus cross-talks into a signal received by the apparatus.

In that case, the reception signal intensity becomes very strong because the transmitting and receiving circuits are close to each other. Consequently, the transmission signal acts as an interference wave or noise that interferes with the target reception signal that the receiver is expected to receive.

Japanese Patent Application Laid-Open Publication No. 2007-505591 discloses that a vector multiplier is used in a multimode radio transmission and reception unit to reduce or eliminate interference with a receiver caused by a transmitter while the transmitter is transmitting a transmission signal to an antenna and at the same time a receiver is receiving a signal in another mode from the antenna.

The vector multiplier controls the phase and amplitude of noise that cross-talks into the receiver (that is, spurious noise).

The configuration for adjusting the phase and amplitude as described in Japanese Patent Application Laid-Open Publication No. 2007-505591 has the drawback that the configuration increases the complexity and size of the circuitry as well as the cost.

SUMMARY OF THE INVENTION

A radio apparatus according to one aspect of the present invention includes: a receiver configured to receive as a reception signal a wirelessly transmitted signal; a transmitter provided in the vicinity of the receiver and configured to generate a transmission signal to be wirelessly transmitted with a frequency different from that of the reception signal; and a reception signal extracting unit provided in the receiver and configured to extract a reception signal from an input signal containing the reception signal and the transmission signal, at a timing of a zero crossing of the transmission signal in the input signal, by using phase information including a phase of the transmission signal from the transmitter.

A radio apparatus according to another aspect of the present invention includes: a receiver configured to receive as a reception signal a wirelessly transmitted signal; a transmitter provided in the vicinity of the receiver and configured to generate a transmission signal to be wirelessly transmitted with a frequency different from that of the reception signal; a transmission signal generating unit provided in the transmitter and configured to generate phase information of the transmission signal; and a reception signal extracting unit provided in the receiver and configured to extract a reception signal from an input signal containing the reception signal and the transmission signal, at a timing of a zero crossing of the transmission signal in the input signal, by using the phase information input from the transmission signal generating unit.

A radio receiving method according to one aspect of the present invention using a receiver configured to receive as a reception signal a wirelessly transmitted signal and a transmitter provided in the vicinity of the receiver and configured to generate a transmission signal to be wirelessly transmitted with a frequency different from that of the reception signal detects a timing of a zero crossing of the transmission signal in the input signal, from the input signal in the receiver containing the reception signal and the transmission signal, by using phase information including a phase of the transmission signal from the transmitter and extracts the reception signal at the detected timing.

BRIEF DESCRIPTION OF THE DRAWINGS

FIG. 1 is a diagram showing a radio system including a multimode radio apparatus according to a first embodiment of the present invention;

FIG. 2 is a block diagram showing a configuration of a reception signal extracting unit provided in a receiver constituting the multimode radio apparatus;

DETAILED DESCRIPTION OF THE PREFERRED EMBODIMENTS

Figure 3:
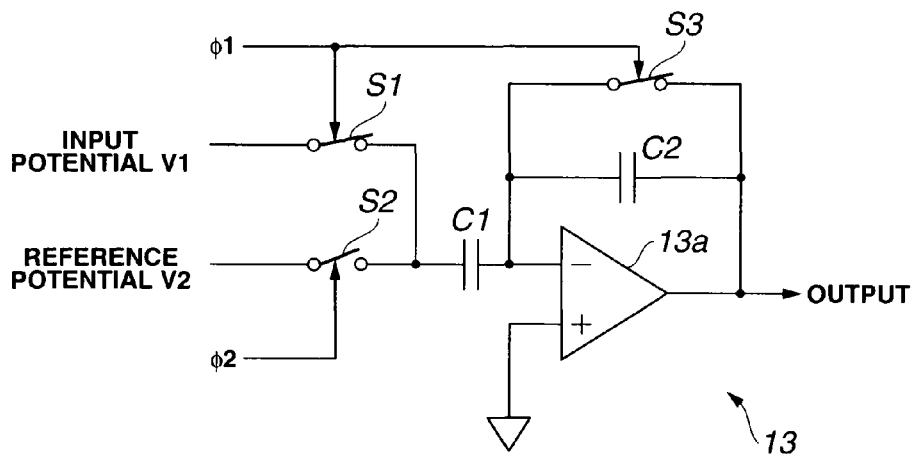
FIG. 3 is a diagram illustrating a configuration and operation of a sampling circuit constituting the reception signal extracting unit.

Embodiments of the present invention will be described with reference to the accompanying drawings.

First Embodiment

FIG. 1 shows a radio system 2 including a multimode radio apparatus 1 according to a first embodiment of the present invention.

The radio system 2 includes the multimode radio apparatus 1 according to the first embodiment and a transceiver or a transmission base station (hereinafter referred to as a transceiver) 3 which communicates with the multimode radio apparatus 1.

The multimode radio apparatus 1 includes one or more transmitters and one or more receivers. In the exemplary configuration shown in FIG. 1 and described below, one transmitter 4 and one receiver 5 are included. In the present embodiment, the multimode radio apparatus 1 has the capability of performing transmission and reception at the same time as will be described below. While the first embodiment will be described with respect to the multimode radio apparatus 1, the present invention can be widely applied to radio apparatuses having the capability of performing transmission and reception at the same time.

The transmitter 4 transmits a transmission signal TX1 generated at the transmitter 4 to the outside (of the multimode radio apparatus 1) through an antenna 6a. The transceiver 3 receives the transmission signal TX1 through an antenna 7. The transceiver 3 transmits a transmission signal TX to the outside of the transceiver 3 through the antenna 7.

The receiver 5 receives the transmission signal TX transmitted from the transceiver 3, for example, as a reception signal RX through an antenna 6b. While separate antennas 6a and 6b are used for transmission and reception in the multimode radio apparatus 1 in FIG. 1, a common antenna may be used instead.

While the receiver 5 is intended to receive the reception signal RX, the receiver 5 also receives the transmission signal TX1 transmitted from the transmitter 4 in addition to the target reception signal RX because the transmitter 4 is located in the vicinity of the receiver 5.

The transmitter 4 in the multimode radio apparatus 1 according to the first embodiment provides a transmission signal TX2 (specifically, a clock signal, which will be described below) having phase information of the transmission signal TX1 to the receiver 5. The receiver 5 includes a reception signal extracting unit 11 configured to use the phase information of the transmission signal TX2 to cause a delay adjusting circuit 10 to adjust a delay amount to cancel or reduce the transmission signal TX1 in an input signal in extracting a reception signal.

FIG. 2 shows a configuration of the reception signal extracting unit 11 provided in the receiver 5.

The target reception signal RX to be received and the transmission signal TX1 are input in the receiver 5 as input signals (through the antenna 6b). The input signals are amplified by an amplifier 12 and then input in the reception signal extracting unit 11. Symbols (fR) and (fT) suffixed to the reception and transmission signal symbols RX and TX1 in FIG. 2 denote the frequencies of the signals. The same symbols are also used in FIGS. 4A to 4F and 5A to 5F described later.

The reception signal extracting unit 11 includes a sampling circuit 13 configured to sample the reception signal RX and transmission signal TX1, which are input signals, a first low-pass filter (abbreviated as first LPF) 14 configured to extract a reception signal component in a predetermined frequency band from the output signal of the sampling circuits 13, a buffer amplifier 15, and a delay adjusting circuit 10 including a second LPF 14b configured to extract DC component from an output signal of the sampling circuit 13, and other components. The buffer amplifier 15 in FIG. 2 may be omitted from the configuration.

The delay adjusting circuit 10 includes the second LPF 14b configured to extract a DC component, an analog control circuit 16 configured to use an output signal of the second LPF 14b to adjust (or control) the timing of sampling in the sampling circuit 13, and a delay circuit 17 configured to vary the phase amount (more specifically, the amount of delay) of a clock signal for sampling under the control of the control circuit 16.

The control circuit 16 performs control to adjust the amount of delay on the basis of the output signal of the second LPF 14b so that the timing of sampling of an input signal in the sampling circuit 13 is synchronized with a zero crossing timing at which the transmission signal TX1 crosses a zero level (zero potential).

The control circuit 16 includes an operational amplifier (hereinafter abbreviated as op-amp) 16a configured to output a difference signal, for example.

The op-amp 16a adjusts the amount of delay of the delay circuit 17 by a difference signal resulting from comparing a second LPF output signal applied to an inverting input terminal with the zero potential (reference potential) at a noninverting input terminal grounded.

The delay circuit 17 is configured with a variable delay element, for example, whose delay amount can be varied (adjusted). A transmission signal TX2 having phase information of the transmission signal TX1 of the transmitter 4 is input in the delay circuit 17, which delays the transmission signal TX2.

The transmission signal TX2 consists of a clock signal $\phi o1$ generated from the transmission signal TX1 and a clock signal $\phi o2$ of opposite phase to the clock signal $\phi o1$.

The clock signals $\phi o1$ and $\phi o2$ pass through the delay circuit 17 and become clock signals $\phi 1$, $\phi 2$ acting as a sampling signal. The sampling circuit 13 samples an input signal by the clock signals $\phi 1$, $\phi 2$.

The op-amp 16a performs control to automatically adjust the amount of delay, that is, the phase of the sampling signal, so that the value of the difference signal, in particular, the output signal of the second LPF 14b becomes zero (or the difference between the output signal and the zero reference potential is minimized).

For example, a control loop is formed that adjusts the amount of delay (phase amount) according to the phase relation between the timing (phase) of a zero crossing of the transmission signal TX1 and the timing (phase in which the input signal is sampled) of a trailing edge of the clock signal $\phi 1$ so that the difference between the phases decreases, as shown in FIGS. 4A to 4F, which will be described below.

In the case shown in FIGS. 4A to 4F, the difference signal from the op-amp 16a is used to adjust the length of delay of the delay circuit 17 so that the phase of the clock signal $\phi 1$ shifts to the right, in other words, the phase delays. Although not shown in FIGS. 4A to 4F, if a trailing edge of the clock signal ϕ1 is delayed from the phase of a zero crossing of the transmission signal TX1, the polarity of the difference signal is reversed. In that case, the amount of delay is adjusted to shift the trailing edge of the clock signal ϕ1 to the left, that is, to advance the phase.

In this way, the delay adjusting circuit 10 in the present embodiment includes the control loop that automatically adjusts the phase of the sampling signal for sampling an input signal so that the phase becomes a predetermined phase on the basis of the output signal of the sampling circuit 13.

The control loop controls the amount of delay so that a trailing edge of the clock signal ϕ1, that is, the timing of sampling, is set at the timing of a zero crossing of the transmission signal TX1 as shown in FIGS. 5A to 5F and the setting state is maintained.

The first LPF 14a is set to have an LPF characteristic that passes a signal of a frequency component of |fR−fT|, where fR is the frequency of the reception signal RX and fT is the frequency of the transmission signal TX1. The second LPF 14b is set to have an LPF characteristic that passes a DC component as stated above.

An output signal of the first LPF 14a is input in a demodulation block 18 through the buffer amplifier 15. The demodulation block 18 demodulates the reception signal RX.

Operation in FIG. 2 will be outlined below. A reception signal RX and a transmission signal TX1 are input in the sampling circuit 13 and the input signal is sampled by using clock signals ϕ1, ϕ2 which constitute a transmission signal TX2 having the same phase information as the transmission signal TX1.

The sampling converts the reception signal RX to a signal having a frequency of |fR·fT| and converts the transmission signal TX1 to a DC signal.

The output signal of the sampling circuit 13 is passed through the first LPF 14a and second LPF 14b thereby extracting separately a reception signal component with a frequency of |fR·fT|, which is a first LPF 14 output, and a DC component signal, which is a second LFP output.

The DC component signal output from the second LPF 14b adjusts the amount of delay of the delay circuit 17, that is, controls the sampling timing of the sampling signal, so that the difference signal output from the op-amp 16a approaches zero.

The reception signal component with a frequency of |fR·fT|, which is the first filter output signal, is input in the demodulation block 18 located at the subsequent stage of the receiver 5 through the buffer amplifier 15.

FIG. 3 illustrates a configuration and operation of the sampling circuit 13. The configuration of the sampling circuit 13 will be described first with reference to FIG. 3.

The sampling circuit 13 includes an amplifier, op-amp 13a, for example. The sampling circuit 13 includes switches S1, S2, and S3 and capacitances C1 and C2 in addition to the op-amp 13a.

Switches S1 and S2 are turned on and off by the clock signals ϕ1 and ϕ2, respectively. An input signal (its input potential V1) and a reference signal (its reference potential V2) are input into switches S1 and S2, respectively.

Switch S3 is turned on and off by the clock signal ϕ1, like switch S1. Switches S1 and S2 are controlled in such a manner that they are not turned on at the same time.

The input potential V1 and reference potential V2 input through switches S1 and S2, respectively, are applied to an inverting input terminal of the op-amp 13a through capacitance C1. A noninverting input terminal of the op-amp 13a is grounded and capacitance C2 and switch S3 are connected in parallel between the inverting input terminal and an output terminal.

Operation of the sampling circuit 13 having the configuration described above will be described below.

When switches S1 and S3 are turned on by the clock signal ϕ1 and switch S2 is turned off by the clock signal ϕ2, capacitance C1 is charged with a charge corresponding to the input potential V1.

When subsequently switches S1 and S3 are turned off by the clock signal ϕ1, a charge corresponding to the input potential V1 at the instant of the switching-off is stored in capacitance C1.

Then, when switch S2 is turned on by the clock signal ϕ2, a charge corresponding to the difference between the potential V1 at the instant of the switching-off of switch S1 by the clock signal ϕ1 and the reference potential V2 is transferred to capacitance C2. As a result, a potential of (V1·V2)*C1/C2 appears at the output terminal.

In the sampling circuit 13 in FIG. 2, the reference potential V2 in FIG. 3 is set to the ground potential, zero, and the input potential V1 is equal to the signal voltage of the reception signal RX and transmission signal TX1 constituting an input signal. Accordingly, a signal proportional to the input potential V1 of the input signal is sampled by the sampling circuit 13 and is output from the output terminal of the sampling circuit 13.

The clock signals ϕ1 and ϕ2 have opposite phases as described below.

In particular, the clock signals ϕ1 and ϕ2 are clock signals (binary signals) having phases the timing of which is at a zero crossing of the transmission signal TX1. The clock signals ϕ1 and ϕ2 have opposite phases (for further details, see FIG. 9 described later).

Operation according to the present embodiment will be described with reference to FIGS. 4A to 4F and 5A to 5F.

FIGS. 4A to 4F show operations of components of the reception signal extracting unit 11 before or during adjustment of the amount of delay by the delay adjusting circuit 10. The horizontal axis of FIGS. 4A to 4F and 5A to 5F represents time t.

Figure 4A:
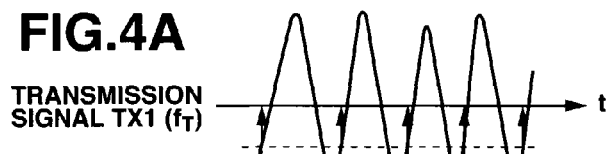
FIGS. 4A to 4F are diagrams illustrating operations of components of the reception signal extracting unit before delay adjustment.
Figure 4B:
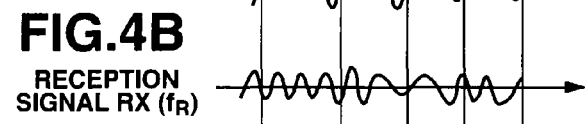

A transmission signal TX1 and a reception signal RX are input in the sampling circuit 13 as shown in FIGS. 4A and 4B.

Because the transmitter 4 is located near the receiver 5, the transmission signal TX1 (fT) is input in the sampling circuit 13 as an interference wave or noise having an amplitude larger than that of the reception signal RX (fR).

Figure 4C:
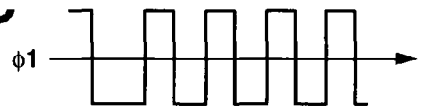
Figure 4D:
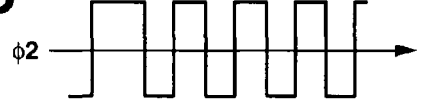

The transmission signal TX1 (fT) and reception signal RX (fR) as input signals are sampled by using a transmission signal TX2 having phase information of the transmission signal TX1, more specifically, the clock signals ϕ1 and ϕ2 shown in FIGS. 4C and 4D.

Here, the transmission signal TX1 and the transmission signal TX2 (specifically, clock signals ϕ1 and ϕ2) are signals generated from the same signal and differ only in that the signals TX1 and TX2 are delayed or advanced as a whole with respect to each other in time t, that is, the signals TX1 and TX2 are phase-shifted in time with respect to each other. Accordingly, when the transmission signal TX1 is sampled by using the clock signals ϕ1, ϕ2, almost the same level will be sampled and therefore the sampling circuit 13 will output a signal that is substantially a DC signal.

Figure 4E:
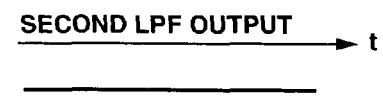

The output signal of the sampling circuit 13 includes a small amount of reception signal RX information. However, only the DC component is extracted by the second LPF 14b. FIG. 4E to the right of FIG. 4A shows the output signal of the second LPF 14b, namely the second LPF output. The second LPF output corresponds to a sampled value of the transmission signal TX1 shown to the left.

Figure 4F:

A first LPF output is shown in FIG. 4F below the second LPF output in FIG. 4E.

Because the second LPF output (DC component) is superimposed on the first LPF output, the first LPF output contains a noise component (the DC component of the second LPF output) larger than the reception signal RX.

The output signal of the second LPF 14b is input in the op-amp 16a and a control loop functions to control the amount of delay of the delay circuit 17 so that the difference between the DC component of the second LPF output and a reference potential of zero is reduced to zero.

With the control, the timing of sampling is set at the timing of a zero crossing of the transmission signal TX1 as shown in FIGS. 5A to 5F and the setting is maintained.

Figure 5A:
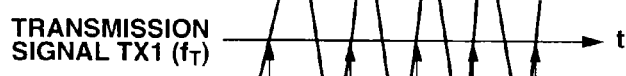
FIGS. 5A to 5F are diagrams illustrating operations of the components of the reception signal extracting unit after the delay adjustment.
Figure 5B:
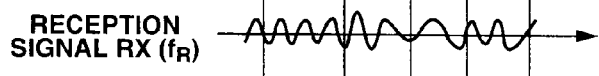
Figure 5C:
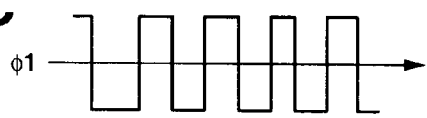
Figure 5D:
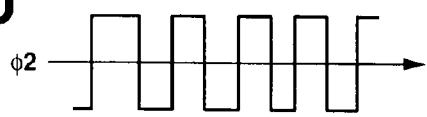
Figure 5E:
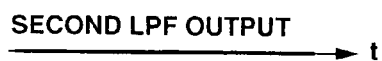

In the setting, the second LPF output becomes zero as shown in FIG. 5E. This means that the sampling at the timing of a zero crossing of the transmission signal TX1 cancels the transmission signal TX1 so that the transmission signal TX1 does not appear in the output signal of the sampling circuit 13.

Figure 5F:

Therefore, a reception signal component can be extracted as the first LPF output in which the transmission signal TX1 is canceled as shown in FIG. 5F.

The reception signal component with a frequency of |fR·fT| extracted by the first LPF 14a can be represented by the product of the transmission signal TX1 and the reception signal RX. Because the frequency fT of the transmission signal is known, demodulation of the reception signal with a frequency of fR is possible.

Additionally, the reception signal RX, which is originally a modulated signal, has been further (doubly) modulated with transmission signal TX. Therefore, the reception signal RX should be demodulated first on the basis of the transmission signal TX and then further demodulated to the original reception signal RX.

The present embodiment can be widely applied to cases where the frequency fT of a transmission signal differs from the frequency fR of a reception signal.

Figure 6:
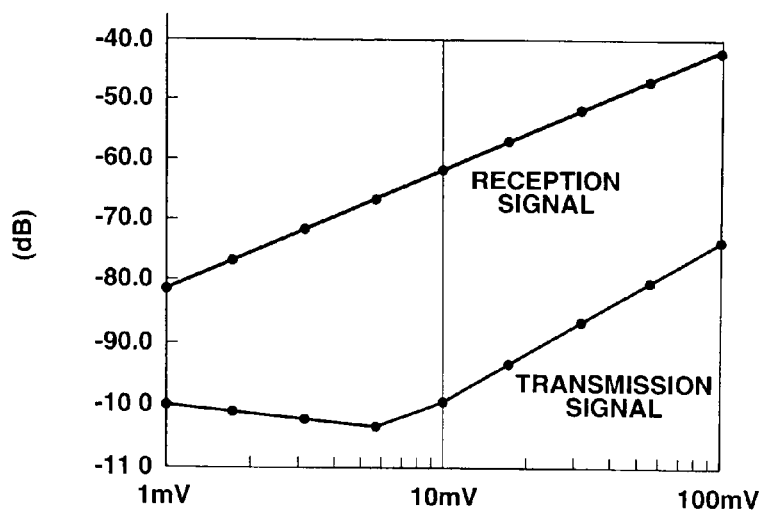
FIG. 6 is a diagram showing an example of the result of a simulation of the operations shown in FIGS. 5A to 5F.

FIG. 6 shows an example of the result of a simulation of a reception signal component (simply expressed as reception signal in FIG. 6) and a transmission signal component (simply referred to as transmission signal in FIG. 6) obtained through the reception signal extracting unit 11 in the state shown in FIGS. 5A to 5F. The vertical axis of FIG. 6 represents the intensity of the signal components output from the reception signal extracting unit 11 and the horizontal axis represents the input intensity of the reception signal.

When the timing of sampling is not set at a zero crossing of the transmission signal TX1, the transmission signal component becomes greater than the reception signal component as shown in the first LPF output in FIG. 4F.

In contrast, when the timing of sampling is set at a zero crossing of the transmission signal TX1 as shown in FIGS. 5A to 5F, a reception condition is achieved in which the reception signal is extracted with the transmission signal component being cancelled to almost zero.

Accordingly, the transmission signal component is sufficiently smaller than the reception signal component in the result of the simulation shown in FIG. 6. Here, the reception signal component varies in proportion to the input amplitude. Therefore, the reception signal component can be appropriately demodulated.

Thus, according to the present embodiment, a target reception signal to be received can be extracted in which a transmission signal TX1 that is significant noise or interference wave interfering with the reception signal is cancelled or sufficiently reduced.

Furthermore, according to the present embodiment, a reception signal component can be extracted with a transmission signal TX1 being cancelled or sufficiently reduced by using a simple configuration.

A variation of the present embodiment will be described next.

Figure 7:
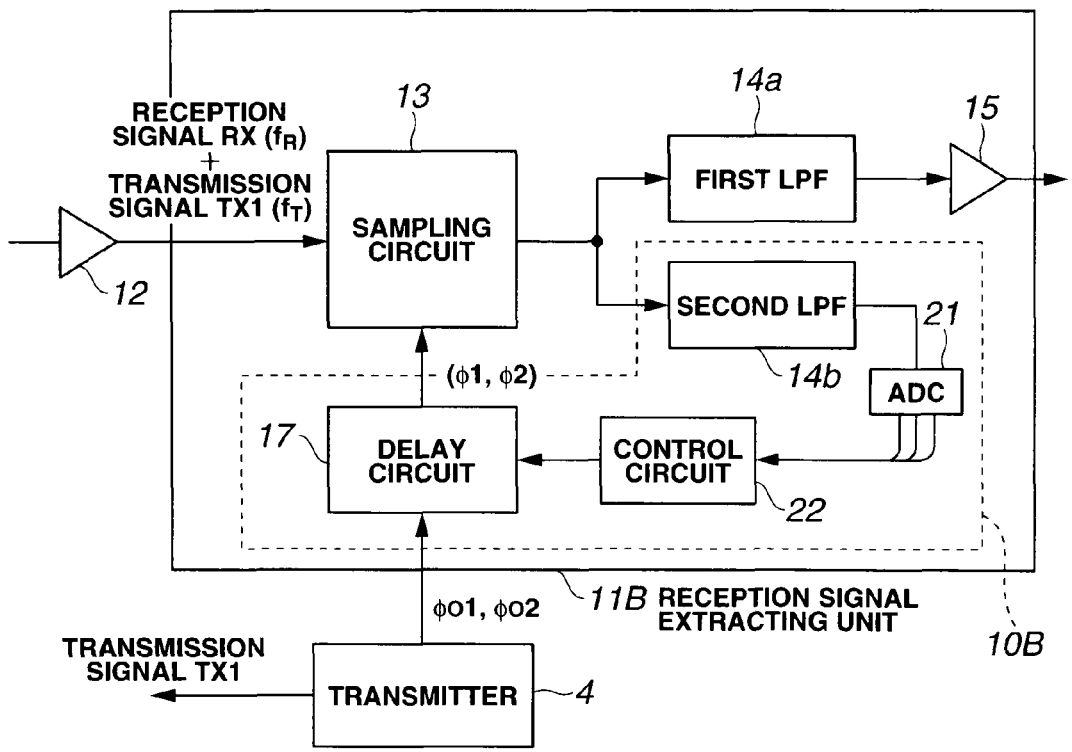
FIG. 7 is a block diagram showing a configuration of a reception signal extracting unit according to a variation of the first embodiment.

FIG. 7 shows an exemplary configuration of a reception signal extracting unit 11B according to a variation of the first embodiment. In FIG. 2, the amount of delay is adjusted in an analog fashion and the sampling circuit 13 samples an input signal at the timing of a zero crossing of a transmission signal TX1 in the input signal.

FIG. 7 shows an exemplary configuration in which the amount of delay is adjusted in a digital fashion. The reception signal extracting unit 11B shown in FIG. 7 uses a digital delay adjusting circuit 10B which slightly differs from the delay adjusting circuit 10 in FIG. 2.

An output signal of the second LPF 14a is input in an analog-digital conversion circuit (abbreviated as ADC) 21, where the signal is converted to a digital signal. The digital signal is input in a digital control circuit 22, which controls the amount of delay of a delay circuit 17 in accordance with the digital value of the ADC 21. The rest of the configuration is the same as that in FIG. 2.

The output from the comparator 16a in the configuration shown in FIG. 2 is an analog quantity whereas the output from the ADC 21 in FIG. 7 is a digital quantity. The configuration has the effect that, as compared with the analog output, the digital output is easy to deal with by adjusting parameters, for example.

Other operations and effects of the variation are similar to those of the embodiment shown in FIG. 2.

Figure 8A:
FIGS. 8A and 8B are diagrams illustrating a periodic control operation for adjusting a delay amount according to the variation.
Figure 8B:
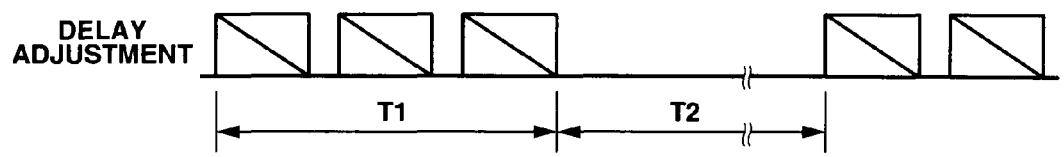

In the variation, the amount of delay may be controlled (adjusted) constantly as in the first embodiment or may be adjusted periodically as shown in FIGS. 8A and 8B.

In the example in FIGS. 8A and 8B, control operation for adjusting the amount of delay of the delay circuit 17 is performed for an appropriate period of time T1 (see FIG. 8B) in synchronization with a vertical synchronizing signal VD shown in FIG. 8A, for example. Then, the control operation for adjusting the amount of delay may be halted for a time period T2, for example, as shown in FIG. 8B. During the time period T2, the ADC 21 and the digital control circuit 22 may be placed in a power saving mode such as a hold state. After the time period T2, the control operation for adjusting the amount of delay may be resumed.

Typically, the positional relationship between a transmitter 4 and a receiver 5 rarely varies with time. Therefore, a reception condition almost the same as the reception condition that can be set to constant control operation can be achieved by the periodic control operation for adjusting the amount of delay as shown in FIGS. 8A and 8B. Accordingly, the variation can provide the same effects as the first embodiment.

Periodic control operation for adjusting the amount of delay as shown in FIGS. 8A and 8B can save more power or can further reduce power consumption.

Second Embodiment

Figure 9:
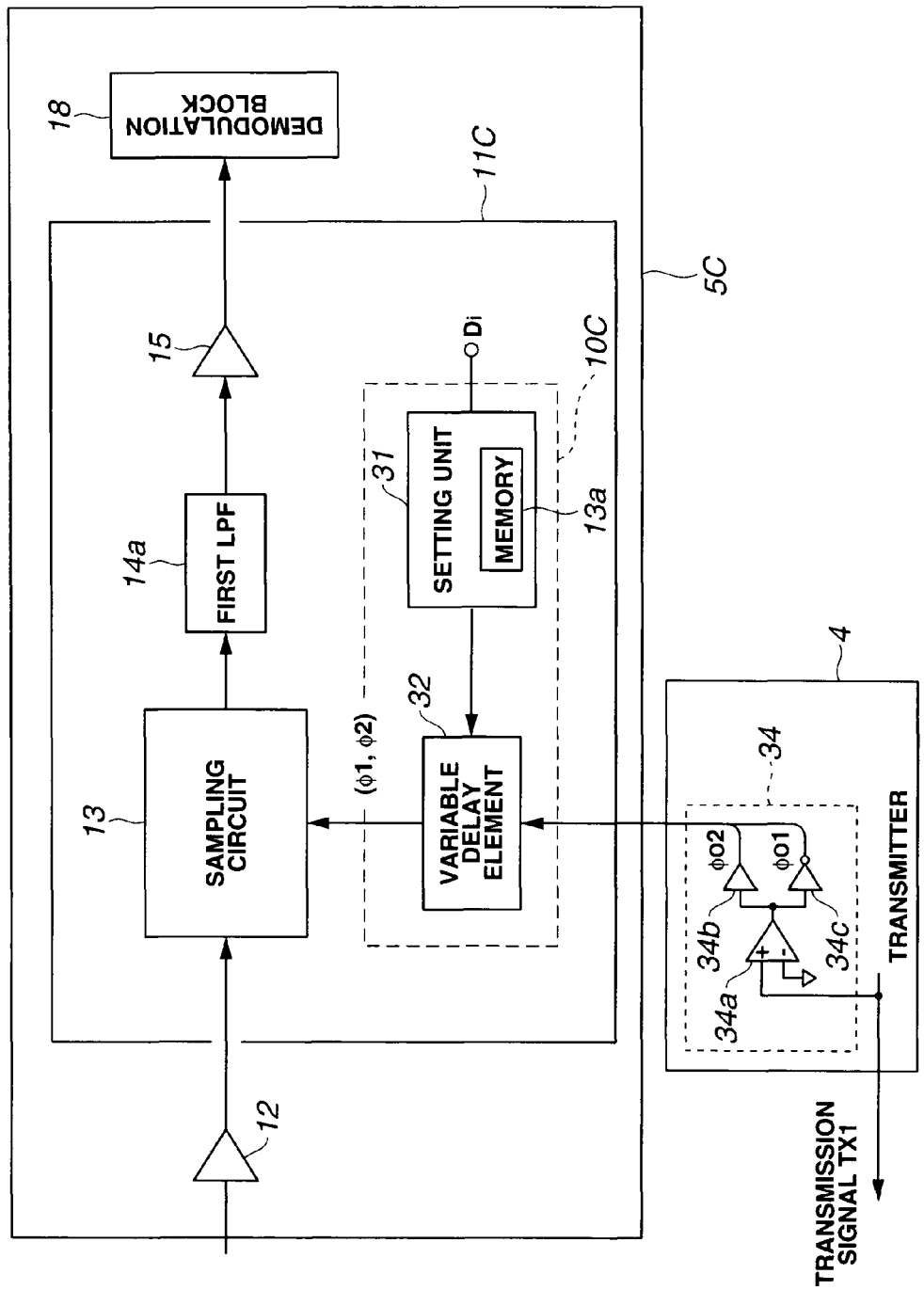
FIG. 9 is a block diagram showing a configuration of a receiver according to a second embodiment of the present invention.

A second embodiment of the present invention will be described below with reference to FIG. 9. FIG. 9 shows a configuration of a receiver 5C in a radio apparatus according to the second embodiment.

In the first embodiment, a control loop is configured that automatically adjusts the timing (phase amount) of clock signals $\phi 1$, $\phi 2$ for sampling in the sampling circuit 13 on the basis of an output signal of the sampling circuit 13 so that the timing is synchronized to the timing of a zero crossing of a transmission signal TX1.

In the radio apparatus according to the present embodiment, on the other hand, a delay adjusting unit 10C which constitutes a reception signal extracting unit 11C in the receiver 5C includes a setting unit 31 configured to set the amount of delay and a variable delay element 32 whose delay is variably set to a predetermined fixed value by the setting unit 31.

In the radio apparatus according to the present embodiment, the transmitter 4 and the receiver 5C are fixed in the radio apparatus. Accordingly, when a transmission signal cross-talks into an input signal input in the sampling circuit 13 in the receiver 5C, it is unlikely that the cross-talk path changes with time.

Therefore, in the present embodiment, the amount of delay (referred to as the zero-crossing delay amount) corresponding to the timing of a zero crossing of a transmission signal TX1 in the sampling circuit 13 or information on the amount of delay is determined beforehand in a receiver 5C to be shipped as a product, for example.

Then, the setting unit 31 is used to set the amount of delay to be produced by the variable delay element 32 to that zero-crossing delay amount.

In this case, the setting unit 31 includes a memory 31a, for example. Data representing the zero-crossing delay amount is written in the memory 31a through a terminal Di beforehand so that the setting unit 31 can use the data stored in the memory 31a to set the amount of delay to be produced by the variable delay element 32 to the zero-crossing delay amount.

The transmitter 4 includes a transmission signal generating unit 34 configured to generate a transmission signal TX2 (specifically, clock signals $\phi o1$ and $\phi o2$) from the transmission signal TX1.

The transmission signal generating unit 34 includes a zero-cross comparator 34a into which the transmission signal TX1 is input, a buffer 34b configured to output an output signal from the zero-cross comparator 34a without inverting, and an inverting buffer 34c configured to invert the signal and output the inverted signal.

The buffer 34b outputs the clock signal $\phi o2$ and the buffer 34c outputs the clock signal $\phi o1$. The clock signals $\phi o1$, $\phi o2$ shown in FIG. 9 are defined so that sampling is performed at a trailing edge of the clock signal $\phi o1$ as shown in FIGS. 4A to 4F and 5A to 5F.

The present embodiment enables a reception signal to be extracted in which the influence of noise or an interference wave due to a transmission signal TX1 is cancelled or sufficiently reduced with a simpler configuration than that of the first embodiment.

The present embodiment can accommodate various placements of the transmitter 4 and the receiver 5C simply by writing in a memory 31a data on the zero-crossing delay amount determined beforehand for each individual model determined, that is, simply by changing data to be written in the memory 31a from model to model.

Once written, the fixed value of the zero-crossing delay amount is used to cancel or sufficiently reduce the influence of an interference wave due to a transmission signal TX1 to extract a reception signal.

Thus, the present embodiment can accommodate various models.

If the path through which a transmission signal TX1 enters the sampling circuit 13 is changed by maintenance of the receive 5C, the data written in the memory 31a can be changed after the maintenance to appropriately address the influence of the transmission signal TX1.

According to a variation of the present embodiment, the delay adjusting circuit may be configured with multiple delay elements (which may be delay lines) having fixed delay amounts, and selection circuits, which may be multiplexers M1, M2, may be used to select any of the delay elements.

Figure 10:
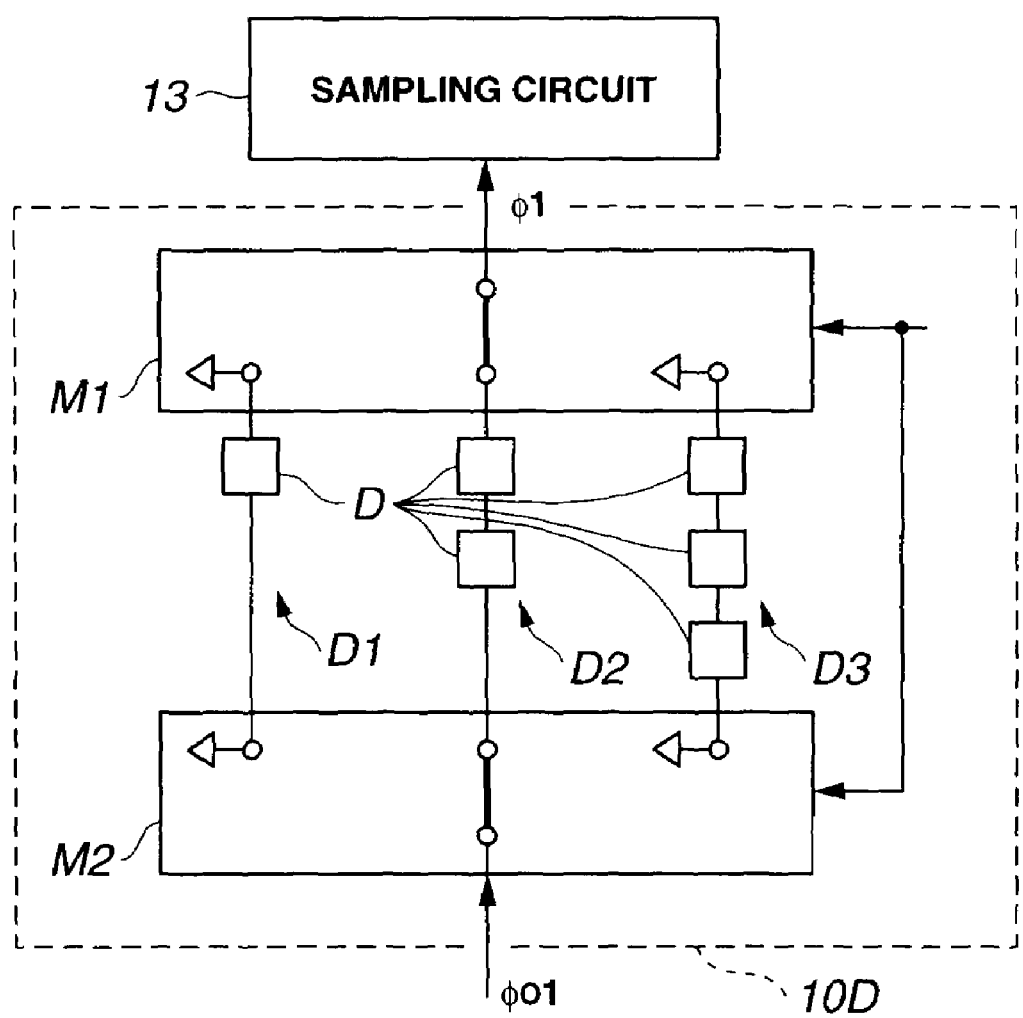
FIG. 10 is a circuit diagram showing an exemplary configuration of a delay adjusting circuit according to a variation of the second embodiment.

FIG. 10 shows a delay adjusting circuit 10D which is an example of such configuration. In the delay adjusting circuit 10D, one delay circuit Dk (k=2 in FIG. 10) out of three delay circuits D1, D2, and D3 that produce different amounts of delay is selected by using multiplexers M1 and M2. A selection signal is applied to the multiplexers M1, M2 from a source such as a memory.

The delay circuits D1, D2, and D3 may be implemented by delay elements D that produce predetermined amounts of delay, for example.

The delay circuit Dk that produces the amount of delay closest to the amount of delay that provides the timing of sampling at a zero crossing of a transmission signal TX1 is selected. Both ends of each of the delay circuits that are not selected are grounded to prevent noise from being induced. One delay adjusting circuit 10D in which clock signal $\phi o1$ is input is shown in FIG. 10. In practice, another delay adjusting circuit 10D having the same configuration is used for clock signal $\phi o2$.

As a variation of the delay adjusting circuit shown in FIG. 10, a delay adjusting circuit (correctly a delay setting circuit in this case) including only one delay circuit Dk for clock signal $\phi o1$ or $\phi o2$ may be used.

If the placement of the transmitter 4 and the receiver 5C is fixed, the path through which a transmission signal TX1 enters the receiver 5C is typically determined, as stated above. Therefore, a fixed amount of delay can be set for the fixed path so that sampling is performed at the timing of a zero crossing of the transmission signal TX1.

In this case, the influence of the transmission signal TX1 can be cancelled or reduced very simply with a low cost.

Alternatively, a delay-variable inverter chain or the like used in a DLL (delay-locked loop) may be used to configure a delay adjusting circuit.

A gate circuit may be used to extract a reception signal component, instead of sampling. The timing at which the gate circuit opens may be adjusted in a manner similar to that for the timing of sampling in the sampling circuit 13, so that the gate circuit passes an input signal at the timing of a zero crossing of a transmission signal TX1 with a short gate width.

The present invention also includes embodiments configured by combining any parts of the embodiments described above.

According to the embodiments described above, a reception signal component can be extracted by canceling or reducing the influence of a transmission signal with a simple configuration when transmission and reception are performed concurrently.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A radio apparatus comprising: a receiver configured to receive as a reception signal a wirelessly transmitted signal; a transmitter provided in the vicinity of the receiver and configured to generate a transmission signal to be wirelessly transmitted with a frequency different from that of the reception signal; and
a reception signal extracting unit provided in the receiver and configured to extract a reception signal component from an input signal containing the reception signal and the transmission signal, at a timing of a zero crossing of the transmission signal in the input signal, by using phase information including a phase of the transmission signal directly input from the transmitter to the receiver, such that the transmission signal contained in the input signal remains only as a DC offset value in the reception signal component, the DC offset value corresponding to a phase difference between the transmission signal in the input signal and the transmission signal directly input from the transmitter;
wherein the reception signal extracting unit extracts a reception signal component having a frequency of |fR−fT|, where fR is a frequency of the reception signal and fT is a frequency of the transmission signal.

2. The radio apparatus according to claim 1, wherein the reception signal component extracting unit samples the input signal at a timing of a zero crossing of the transmission signal in the input signal to extract the reception signal.

3. The radio apparatus according to claim 1, wherein the reception signal extracting unit comprises a sampling circuit configured to sample the input signal by using a sampling signal based on a clock signal having a phase of the transmission signal and a delay adjusting circuit configured to adjust the phase of the clock signal by a time delay to a timing of a zero crossing of the transmission signal in the input signal.

4. The radio apparatus according to claim 3, wherein the delay adjusting circuit uses an output signal of the sampling circuit to automatically adjust the phase of the clock signal to practically reduce a DC component of the output signal to zero.

5. The radio apparatus according to claim 3, wherein the delay adjusting circuit periodically operates at predetermined intervals to adjust a delay amount.

6. The radio apparatus according to claim 4, wherein the reception signal extracting unit extracts a reception signal component having a frequency of |fR−fT|, where fR is a frequency of the reception signal and fT is a frequency of the transmission signal.

7. The radio apparatus according to claim 3, wherein the delay adjusting circuit automatically adjusts the phase of the clock signal by using a preset delay amount corresponding to a timing of a zero crossing of the transmission signal in the sampling circuit.

8. A radio receiving method using a receiver configured to receive as a reception signal a wirelessly transmitted signal, and a transmitter provided in the vicinity of the receiver and configured to generate a transmission signal to be wirelessly transmitted with a frequency different from that of the reception signal, the radio receiving method comprising:
detecting a timing of a zero crossing of the transmission signal in an input signal, which is input to the receiver and containing the reception signal and the transmission signal, by using phase information including a phase of the transmission signal directly input from the transmitter to the receiver; and
extracting a reception signal component from the input signal at the detected timing of the zero crossing such that the transmission signal contained in the input signal remains only as a DC offset value in the reception signal component, the DC offset value corresponding to a phase difference between the transmission signal in the input signal and the transmission signal directly input from the transmitter;
wherein a reception signal component having a frequency of |fR−fT| is extracted, where fR is a frequency of the reception signal and fT is a frequency of the transmission signal.

9. The radio receiving method according to claim 8, wherein the reception signal component is extracted by sampling the input signal at a timing of a zero crossing of the transmission signal in the input signal.

10. The radio receiving method according to claim 8, wherein a phase of a clock signal that is equal to a phase of the transmission signal in the input signal is adjusted by a time delay to a timing of a zero crossing of the transmission signal and the input signal is sampled by using the phase-adjusted clock signal.

11. The radio receiving method according to claim 10, wherein an output signal obtained by sampling the input signal by using a sampling signal based on a clock signal having the phase of the transmission signal is used to automatically adjust the phase of the clock signal to practically reduce a DC component of the output signal to zero.

12. The radio receiving method according to claim 10, wherein the phase of the clock signal having the phase of the transmission signal is adjusted periodically at predetermined intervals.

13. A radio apparatus comprising: a receiver configured to receive as a reception signal a wirelessly transmitted signal; a transmitter provided in the vicinity of the receiver and configured to generate a transmission signal to be wirelessly transmitted with a frequency different from that of the reception signal;
a transmission signal generating unit provided in the transmitter and configured to generate phase information of the transmission signal; and
a reception signal extracting unit provided in the receiver and configured to extract a reception signal component from an input signal containing the reception signal and the transmission signal, at a timing of a zero crossing of the transmission signal in the input signal, by using the phase information directly input from the transmission signal generating unit, such that the transmission signal contained in the input signal remains only as a DC offset value in the reception signal component, the DC offset value corresponding to a phase difference between the transmission signal in the input signal and the transmission signal directly input from the transmitter;
wherein the reception signal extracting unit extracts a reception signal component having a frequency of |fR−fT|, where fR is a frequency of the reception signal and fT is a frequency of the transmission signal.

14. The radio apparatus according to claim 13, wherein the reception signal component extracting unit samples the input signal at a timing of a zero crossing of the transmission signal in the input signal to extract the reception signal.

15. The radio apparatus according to claim 14, wherein the reception signal extracting unit comprises a sampling circuit configured to sample the input signal by using a sampling signal based on a clock signal having a phase of the transmission signal and a delay adjusting circuit configured to adjust the phase of the clock signal by a time delay to a timing of a zero crossing of the transmission signal in the input signal.

16. The radio apparatus according to claim 15, wherein the delay adjusting circuit automatically adjusts the phase of the clock signal by using a preset delay amount corresponding to a timing of a zero crossing of the transmission signal in the sampling circuit.

17. The radio apparatus according to claim 15, wherein the delay adjusting circuit periodically operates at predetermined intervals to adjust a delay amount.

* * * * *